United States Patent [19]
Yoshida

[11] Patent Number: 5,497,217
[45] Date of Patent: Mar. 5, 1996

[54] METHOD OF COPYING A PHOTOGRAPH BY USING A COPIER WITH BORDER ELIMINATING MODE

[75] Inventor: Futoshi Yoshida, Kanagawa, Japan

[73] Assignee: Fuji Photo Film Co., Ltd., Kanagawa, Japan

[21] Appl. No.: 440,934

[22] Filed: May 15, 1995

[30] Foreign Application Priority Data

Sep. 30, 1994 [JP] Japan .................................... 6-237932

[51] Int. Cl.$^6$ ................................................. G03B 27/32
[52] U.S. Cl. ............................................. 355/77; 355/218
[58] Field of Search ....................................... 355/218, 77

[56] References Cited

U.S. PATENT DOCUMENTS

| | | | |
|---|---|---|---|
| 4,733,266 | 3/1988 | Watanabe | 355/218 X |
| 5,311,248 | 5/1994 | Iwata | 355/61 |
| 5,333,039 | 7/1994 | Sagara | 355/218 |

*Primary Examiner*—Joan H. Pendegrass
*Assistant Examiner*—Sophia S. Chen
*Attorney, Agent, or Firm*—Sughrue, Mion, Zinn, Macpeak & Seas

[57] ABSTRACT

A method of copying a photograph by using a copier. In the method, from a photograph original having white borders at four peripheral portions thereof, a photographic print is formed in which the borders are eliminated. Magnification setting processing is effected in which magnification is set from a transverse dimension of each white border and an image dimension, and the photograph original is enlarged. Thereafter, reference position shifting processing is effected in which a reference position, which is a reference during copying processing, is shifted by an amount corresponding to the transverse dimension P of a white border at one side of the photograph original which one side abuts a member provided at a position corresponding to one side of a platen glass. In the magnification setting processing, three white borders, other than the white border at the one side of the photograph original which one side abuts the member, are eliminated. In the reference position shifting processing, only the white border at the one side of the photograph original which one side abuts the member is eliminated. Therefore, all of the white borders provided at the four peripheral portions of the photograph original are eliminated by these processings.

20 Claims, 5 Drawing Sheets

METHOD OF COPYING A PHOTOGRAPH BY USING A COPIER WITH BORDER ELIMINATING MODE

BACKGROUND OF THE INVENTION

1. Field of the Invention

The present invention relates to a method of copying a photograph by using a copier in which copy processing is effected in a state in which an original abuts a member provided at a position corresponding to one side of a platen glass, the method forming, from a photograph original having white borders at the four peripheral portions thereof, a photographic print in which the borders are eliminated.

2. Description of the Related Art

In a case in which an original is copied by using a copier, generally, the original is set by abutting the original against a member provided at a position corresponding to one side of a platen glass. Thereafter, a cover is closed, and by pushing a start key, the original is copied. Copying photograph originals to form photographic prints has been conventionally effected by using this type of copier, more specifically, by using a color copier.

Photograph originals include those having white borders at the four peripheral portions thereof and those which do not have white borders at the four peripheral portions thereof. When the former type of photograph originals are copied and photographic prints are formed, there are cases in which removal of the white borders at the four peripheral portions is desired. In such cases, conventionally, a method has been employed in which the white borders at the four peripheral portions are removed by setting the magnification to a predetermined enlargement magnification and trimming.

However, in accordance with this method, the center of enlargement of the photograph original is set in a vicinity of the center of the member provided at the position corresponding to the one side of the platen glass. Therefore, the white border at this one side remains when the photograph original is enlarged to the photographic print. Namely, in the conventional method, the white borders at all four peripheral portions cannot be eliminated.

SUMMARY OF THE INVENTION

In view of the aforementioned, an object of the present invention is to provide a method of copying a photograph by using a copier, the method forming, from a photograph original having white borders at the respective four peripheral portions thereof, a photographic print in which the borders are eliminated.

A first aspect of the present invention is a method of copying a photograph by using a copier, by using a copier in which copying processing is carried out with an original abutting a member provided at a position corresponding to one side of a platen glass, the method forming, from a photograph original having white borders at the four peripheral portions thereof, a photographic print in which the borders are eliminated, the method comprising the steps of: effecting magnification setting processing, in which, given that P is a transverse dimension of each of the white borders and Q is an image dimension, magnification is set to a predetermined enlargement magnification of greater than or equal to $100\times(Q+2P)/Q$ and the photograph original is enlarged at the predetermined enlargement magnification, the magnification setting processing being effected by selection of a border eliminating mode; and effecting reference position shifting processing in which a reference position, which is a reference at a time at which one of exposure processing and transfer processing is carried out during copying processing, is shifted by an amount corresponding to the transverse dimension P of the white border at one side of the photograph original which one side abuts the member provided at the position corresponding to the one side of the platen glass.

A second aspect of the present invention is a method of copying a photograph in which, in the first aspect of the present invention, the reference position shifting processing is effected such that, during exposure processing, a point in time at which conveying of a photosensitive material to an exposure point at which the photosensitive material is exposed begins differs, by an amount of time corresponding to the transverse dimension P, from a point in time at which conveying of a photosensitive material begins during ordinary copying processing.

A third aspect of the present invention is a method of copying a photograph in which, in the first aspect of the present invention, the reference position shifting processing is effected such that, during exposure processing, a position at which illumination of light from a light source onto the photograph original begins is moved by a length of the transverse dimension P.

A fourth aspect of the present invention is a method of copying a photograph in which, in the first aspect of the present invention, the reference position shifting processing is effected such that, during a preliminary processing of the exposure processing, the member provided at the position corresponding to the one side of the platen glass is moved by a length of the transverse dimension P in a direction opposite to a side at which the photograph original is disposed.

A fifth aspect of the present invention is a method of copying a photograph in which, in the first aspect of the present invention, the reference position shifting processing is effected such that, during transfer processing, a point in time at which transfer of an image from an exposed photosensitive material to an image receiving material begins differs, by an amount of time corresponding to the transverse dimension P, from a point in time at which transfer begins during ordinary transfer processing.

In accordance with the first aspect of the present invention, when the border eliminating mode is selected, magnification setting processing and reference position shifting processing are carried out.

In magnification setting processing, given that P is a transverse dimension of the white border of the photograph original and that Q is an image dimension, the magnification is set to a predetermined enlargement magnification greater than or equal to $100\times(Q+2P)/Q$. When copying processing is carried out with magnification setting processing having been effected, the white borders at the three sides other than the white border at the side which abuts the member provided at the position corresponding to the one side of the platen glass are eliminated.

In reference position shifting processing, the reference position, which is a reference at the time that either exposure processing or transfer processing is carried out during copying processing, is shifted, with respect to the member provided at the position corresponding to the one side of the platen glass, by an amount corresponding to the transverse dimension P of the white border at the abutting side. As a result, in either exposure processing or transfer processing, the shifted reference position is used as the reference. When copying processing is carried out with reference position shifting processing having been effected, only the white border at the side which abuts the member provided at the position corresponding to the one side of the platen glass is eliminated.

As a result, by carrying out both of the above processings, a photographic print is formed in which the white borders at all four peripheral portions are eliminated.

In accordance with the second aspect of the present invention, the reference position shifting processing of the first aspect of the present invention is effected such that, during exposure processing, the point in time at which conveying of the photosensitive material to the exposure point begins differs (more specifically, is either delayed or set ahead), by an amount of time corresponding to the width P of the white border, from the point in time at which conveying begins during ordinary exposure processing. In this method, the position at which illumination of light from the light source to the photograph original begins is the position of the one side, as usual. Therefore, if ordinary processing were effected, the white border at the abutting side would be exposed as is onto the photosensitive material. However, in accordance with the present aspect, because the point in time at which conveying of the photosensitive material to the exposure point begins is either delayed or set ahead by an amount of time corresponding to the transverse dimension P, the white border is not exposed onto the photosensitive material. Accordingly, the white border at the abutting side is eliminated.

In accordance with the third aspect of the present invention, the reference position shifting processing of the first aspect of the present invention is effected such that, during exposure processing, the position at which illumination of light from the light source onto the photograph original begins is shifted by the transverse dimension P. In this method, the point in time at which the conveying of the photosensitive material to the exposure point begins matches the point in time at which exposure usually starts. Therefore, if ordinary processing were effected, the white border at the abutting side would be exposed as is onto the photosensitive material. However, in accordance with the present aspect, from the start, light is illuminated from the light source to portions other than the white border at the abutting side. Therefore, the white border is not exposed onto the photosensitive material. Accordingly, the white border at the abutting side is eliminated.

In accordance with the fourth aspect of the present invention, the reference position shitting processing of the first aspect of the present invention is effected such that, as a preliminary process of exposure processing, the member provided at the position corresponding to the one side of the platen glass is directly shifted by the transverse dimension P to the side opposite the photograph original. In this method, the position at which illumination of light from the light source to the photograph original begins and the point in time at which conveying of the photosensitive material to the exposure point begins are the same as usual. Therefore, if ordinary processing were effected, the white border at the abutting side would be exposed as is onto the photosensitive material. However, in accordance with the present aspect, the member provided at the position corresponding to the one side of the platen glass is directly shifted before exposure begins. Therefore, if exposure processing is carried out with the photograph original abutting the one side which has been shifted, it will be the same as if the white border never existed at the abutting side. Accordingly, the white border at the abutting side is eliminated.

In accordance with the fifth aspect, the reference position shifting processing of the first aspect of the present invention is effected such that, during transfer processing, the point in time at which transfer of an image of the exposed photosensitive material to the image receiving material begins differs (more specifically, is either delayed or set ahead), by an amount of time corresponding to the transverse dimension P, from the point in time at which transfer begins during ordinary transfer processing. In this method, when exposure processing has been effected, the white border at the abutting side remains as is on the photosensitive material. The point in time at which transfer begins during transfer processing is delayed or set ahead by an amount of time corresponding to the transverse dimension P. Therefore, the white border at the abutting side, which border has been exposed onto and remains on the photosensitive material, is not transferred onto the image receiving material. Accordingly, the white border at the abutting side is eliminated.

DESCRIPTION OF THE PREFERRED EMBODIMENT

An embodiment of the method of copying a photograph by using a copier relating to the present invention will be described hereinafter with reference to FIGS. 1 through 5.

First, the overall structure and basic operation of a copier (color copier) 10 (see FIG. 5), which is the subject to which the method of copying a photograph relating to the present embodiment is applied, will be described. Thereafter, details of the method of copying a photograph relating to the present embodiment will be described.

Figure 5:
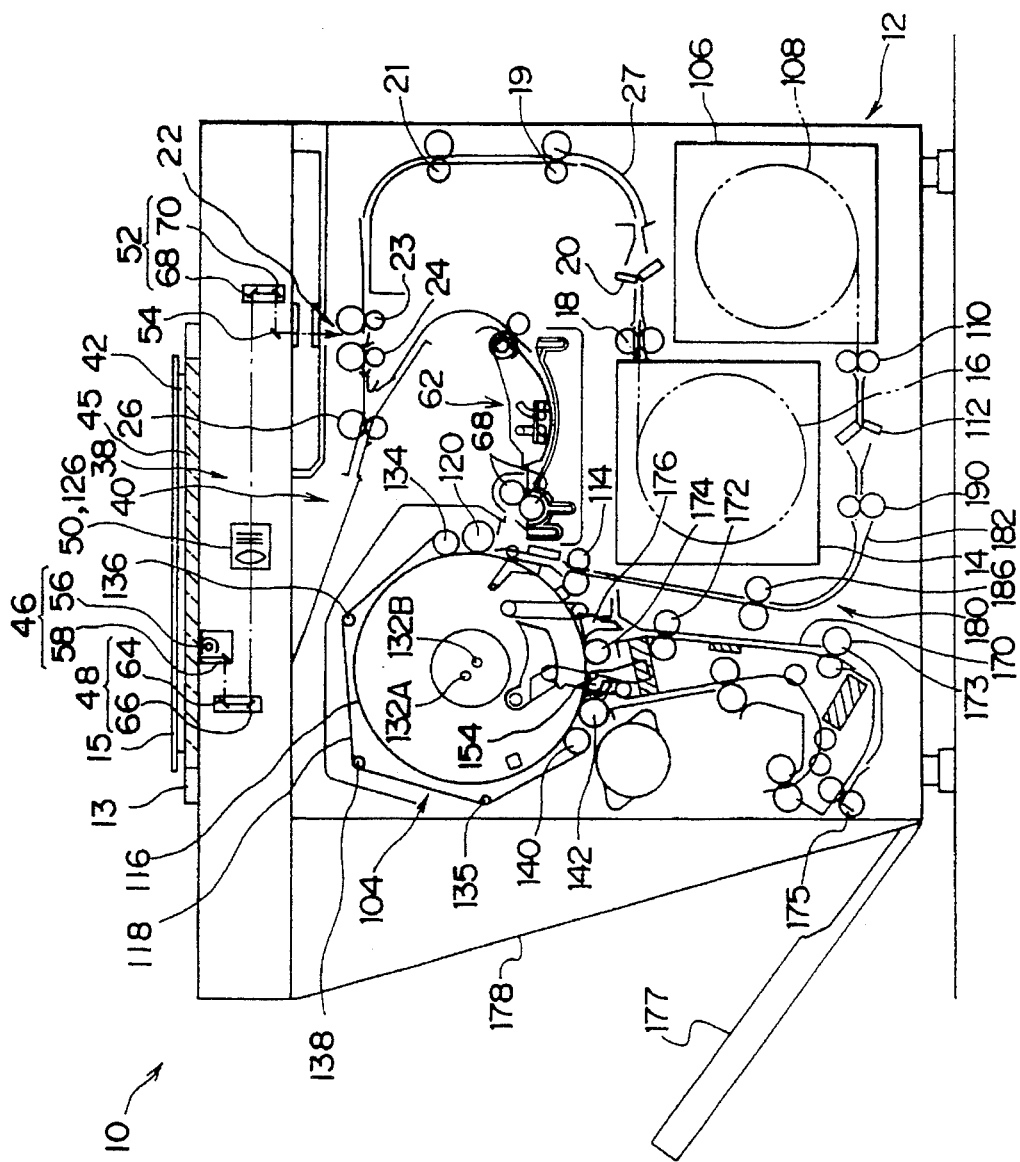
FIG. 5 is a schematic overall structural view illustrating the structure of a copier relating to the present embodiment.

With regard to the overall structure and the basic operation of the copier 10, as illustrated in FIG. 5, the copier 10 is structured on the whole in a box-shape. A frame-shaped stand 13, which is provided with a rectangular hole in the center thereof, is disposed on the top surface of a machine stand 12. A transparent glass plate 45 which is rectangular and shaped as a flat plate is attached within the hole of the stand 13. Further, a presser cover 15 which can open and close is attached to the device at the rear side of the transparent glass plate 45 (more specifically, at the side of the transparent glass plate 45 toward the rear of the paper surface of FIG. 5).

A photosensitive material magazine 14 is disposed within the machine stand 12 of the copier 10. A photosensitive material 16 which is wound in a roll-form is accommodated in the photosensitive material magazine 14. The photosensitive material 16 is wound such that the photosensitive surface (exposure surface) thereof is oriented toward the winding shaft (unillustrated). Nip rollers 18 and a cutter 20 are disposed in a vicinity of the opening of the photosensitive material magazine 14 from which the photosensitive material 16 is withdrawn, so that the photosensitive material 16 can be cut after a predetermined length thereof is pulled out from the photosensitive material magazine 14. A plurality of conveying rollers 19, 21, 23, 24, 26 and guide plates 27 are disposed at the conveying path downstream side of the cutter 20, and convey the photosensitive material 16, which has been cut to the predetermined length, to an exposure section 22.

The exposure section 22 is positioned between the conveying roller 23 and the conveying roller 24. The space between these conveying rollers is the exposure section 22 (i.e., exposure point), and the photosensitive material 16 passes thereby.

An exposure device 38 is provided at a space above the exposure section 22 and beneath the transparent glass plate 45. The exposure device 38 is equipped with a lamp unit 46, a mirror unit 48, a filter unit 50/lens unit 126, a mirror unit 52, and a sixth mirror 54.

The lamp unit 46 is formed from a rod-shaped halogen lamp 56, which functions as a light source, and a first mirror 58. The mirror unit 48 is formed from a second mirror 64 and a third mirror 66. The filter unit 50 is provided with three color adjusting filters so that three types (C, M, Y) of color correction can be effected. The lens unit 126 is formed from a lens and a diaphragm mechanism portion, and works to image the light reflected from the third mirror 66. The lens unit 126 is assembled integrally with the filter unit 50. The mirror unit 52 is formed from a fourth mirror 68 and a fifth mirror 70. The sixth mirror 54 is disposed so as to guide the light reflected from the fifth mirror 70 to the exposure point.

At the exposure device 38, at the time of regular exposure (i.e., exposure at the same magnification as the original), while the light from the halogen lamp 56 is illuminated in a slit-shape onto an original 42 which has been placed on the transparent glass plate 45, the lamp unit 46 and the mirror unit 48 move along the original 42 (the transparent glass plate 45) and scan/expose the light reflected from the original 42 onto the photosensitive material 16 positioned at the exposure section 22. When the magnification is changed and exposure is carried out, the filter unit 50/lens unit 126 and the mirror unit 52 move along the transparent glass plate 45 in accordance with the magnification, and in the same way as described above, the lamp unit 46 and the mirror unit 48 move along the original 42 so that light is scanned/exposed onto the photosensitive material 16 positioned at the exposure section 22.

A switch back section 40 is provided next to the exposure section 22. Further, a water application section 62 is provided beneath the exposure section 22. The photosensitive material 16, which was conveyed upwardly along the conveying path at the side of the photosensitive material magazine 14 and which was exposed at the exposure section 22, is delivered temporarily into the switch back section 40. Thereafter, the conveying roller 26 is rotated reversely so that the photosensitive material 16 is delivered into the water applying section 62 via a conveying path provided under the exposure section 22.

A heat developing transfer section 104 is disposed next to the water applying section 62. The photosensitive material 16, to which water has been applied, is sent into the heat developing transfer section 104.

A receiving material magazine 106 is provided next to the photosensitive material magazine 14 in the machine stand 12. An image receiving material 108 wound in roll form is accommodated within the receiving material magazine 106. A dye fixing material having mordant is applied to the image forming surface of the image receiving material 108. The image receiving material 108 is wound such that the image forming surface thereof is oriented toward a shaft (unillustrated) which winds the image receiving material 108. Nip rollers 110 are disposed in a vicinity of the opening of the receiving material magazine 106 from which the image receiving material 108 is withdrawn. The nip rollers 110 can pull the image receiving material 108 out from the receiving material magazine 106, and the nipping thereof can be released. A cutter 112 is disposed next to the nip rollers 110.

An image receiving material conveying section 180 is provided next to the cutter 112 and next to the photosensitive material magazine 14. Conveying rollers 186, 190, 114 and guide plates 182 are disposed in the image receiving material conveying section 180, and can convey the image receiving material 108, which has been cut by the cutter 12 to a predetermined length, to the heat developing transfer section 104.

The photosensitive material 16 conveyed to the heat developing transfer section 104 is delivered between a laminating roller 120 and a heat drum 116. Synchronously with the conveying of the photosensitive material 16, the image receiving material 108 is conveyed between the laminating roller 120 and the heat drum 116 in a state in which the photosensitive material 16 precedes the image receiving material 108 by a predetermined length, and the photosensitive material 16 and the image receiving material 108 are superposed.

A pair of halogen lamps 132A, 132B are disposed at the interior portion of the heat drum 116. The temperature of the surface of the heat drum 116 can be raised by the halogen lamps 132A, 132B.

An endless press-contact belt 118 is trained around five training rollers 134, 135, 136, 138, 140. The outer side of the endless press-contact belt 118 positioned between the training roller 134 and the training roller 140 press-contacts the outer periphery of the heat drum 116.

A bending/guiding roller 142 is disposed at the material conveying path downstream side of the endless belt 118 and beneath the heat drum 116. At the material conveying path downstream side of the bending/guiding roller 142 and beneath the heat drum 116, a peeling claw 154 is axially supported by a shaft so as to be pivotable.

The photosensitive material 16 peeled by the peeling claw 154 is trained around the bending/guiding roller 142 and is discharged into a waste photosensitive material accommodating box 178 so as to be accumulated.

A peeling roller 174 and a peeling claw 176 are disposed next to the bending/guiding roller 142 in a vicinity of the heat drum 116. Receiving material guides 170 as well as receiving material discharge rollers 172, 173, 175 are provided under the peeling roller 174 and the peeling claw 176, and can guide and convey the image receiving material 108 which has been peeled from the heat drum 116 by the peeling roller 174 and the peeling claw 176.

The image receiving material 108, which has been peeled from the outer periphery of the heat drum 116 by the peeling claw 176, is conveyed by the receiving material guides 170 and the receiving material discharge rollers 172, 173, 175, and is discharged into a tray 177.

Next, basic operation of the copier 10 described above will be explained.

First, the original 42 is placed on the transparent glass plate 45 and the presser cover 15 is closed. Then, when the magnification of the recorded image, the number of photographic prints to be formed and the like are designated from an operation panel 206 (see FIG. 4) and a start designation is given, copying processing begins.

Namely, with the photosensitive material magazine 14 set, the nip rollers 18 are operated, and the photosensitive material 16 is pulled out by the nip rollers 18. When a predetermined length of the photosensitive material 16 has been pulled out, the cutter 20 is operated so that the photosensitive material 16 is cut to a predetermined length. After the cutter 20 is operated, the photosensitive material 16 is conveyed along the conveying path so that the direction thereof is reversed, and is conveyed to the exposure section 22 with the photosensitive surface (exposure surface) thereof facing upward. The exposure device 38 is operated simultaneously with the conveying of the photosensitive material 16.

At the exposure device 38, during ordinary exposure (i.e., exposure at the same magnification as the original), while light from the halogen lamp 56 is illuminated in a slit-shape onto the original 42 disposed on the stand 13, the lamp unit 46 and the mirror unit 48 are slid on an unillustrated pair of upper rails along the original 42 (transparent glass plate 45). In this way, the light reflected from the original 42 reaches the filter unit 50/lens unit 126 via the first mirror 58 of the lamp unit 46 and the second mirror 64 and the third mirror 66 of the mirror unit 48.

At the lens unit 126, imaging and density (exposure amount) adjustment are effected by the lens and the diaphragm mechanism. Further, at the filter unit 50, color correction in accordance with the color densities of the original 42 is effected by the three color adjusting filters. The light which passes through the filter unit 50 is, via the fourth mirror 68 and the fifth mirror 70 of the mirror unit 52, reflected by the sixth mirror 54 and is scanned/exposed onto the photosensitive material 16 positioned at the exposure section 22.

When the magnification is changed and exposure is carried out, the filter unit 50/lens unit 126 and the mirror unit 52 are slid along unillustrated rods and unillustrated lower rails to a predetermined position on the optical path in accordance with the designated magnification. Further, in the same way as the case described above, the lamp unit 46 and the mirror unit 48 move along the original 42 so that the light is scanned/exposed onto the photosensitive material 16 positioned at the exposure section 22.

After exposure has been completed by the exposure device 38 as described above, the photosensitive material 16 is temporarily sent into the switch back section 40. Thereafter, the conveying rollers 26 are rotated reversely so that the photosensitive material 16 is fed into the water applying section 62. In the water applying section 62, water is applied to the photosensitive material 16. Further, the photosensitive material 16 passes through the water applying section 62 while excess water is removed therefrom by squeeze rollers 68. The photosensitive material 16 which has passed through the water applying section 62 is delivered into the heat developing transfer section 104 by the squeeze rollers 68.

As the scanning/exposing of the photosensitive material 16 begins, the image receiving material 108 is pulled out from the receiving material magazine 106 by the nip rollers 110 and is conveyed thereby. When a predetermined length of the image receiving material 108 has been pulled out, the cutter 112 is operated so as to cut the image receiving material 108 to the predetermined length. After the cutter 112 is operated, the image receiving material 108 is conveyed by the conveying rollers 190, 186, 114 while being guided by the guide plates 182, and is held in a standby state immediately before the heat developing transfer section 104.

At the heat developing transfer section 104, when the delivery of the photosensitive material 16 between the outer periphery of the heat drum 116 and the laminating roller 120 by the squeeze rollers 68 is detected, the conveying of the image receiving material 108 is restarted so that the image receiving material 108 is delivered to the laminating roller 120, and also the heat drum 116 is operated.

A guide plate is disposed between the laminating roller 120 and the squeeze rollers 68 of the water applying section 62. The photosensitive material 16 delivered from the squeeze rollers 68 is reliably guided to the laminating roller 120 by the guide plate.

The photosensitive material 16 and the image receiving material 108, which are superposed by the laminating roller 120, are nipped in a superposed state between the heat drum 116 and the endless press-contact belt 118, and are conveyed over approximately ⅔ of the periphery of the heat drum 116 (between the training roller 134 and the training roller 140). The photosensitive material 16 and the image receiving material 108 are thereby heated. Mobile dyes are released, and at the same time, the dyes are transferred to the dye fixing layer of the image receiving material 108 so that an image is obtained.

Thereafter, when the photosensitive material 16 and the image receiving material 108, which are nipped and conveyed, reach the bottom portion of the heat drum 116, the peeling claw 154 is moved by a cam. The peeling claw 154 engages the leading end portion of the photosensitive material 16 which is conveyed so as to precede the image receiving material 108 by a predetermined length, and the leading end portion of the photosensitive material 16 is peeled from the outer periphery of the heat drum 116. Due to the return movement of the peeling claw 154, a pinch roller presses the photosensitive material 16. The photosensitive material 16 is thereby trained around the bending/guiding roller 142 while being pressed by the pinch roller, and is moved downward and accumulated in the waste photosensitive material accommodating box 178.

The image receiving material 108, which has been separated from the photosensitive material 16 and which moves while still fit closely to the heat drum 116, is sent to the peeling roller 174 and is peeled. The image receiving material 108, which has been peeled from the outer periphery of the heat drum 116 by the peeling claw 176, is moved downwardly while trained around the peeling roller 174. The image receiving material 108 is conveyed by the receiving material discharge rollers 172, 173, 175 while being guided by the receiving material guides 170, and is discharged into the tray 177.

Next, detailed description will be given of the method of copying a photograph by using the above-described copier 10.

Figure 4:
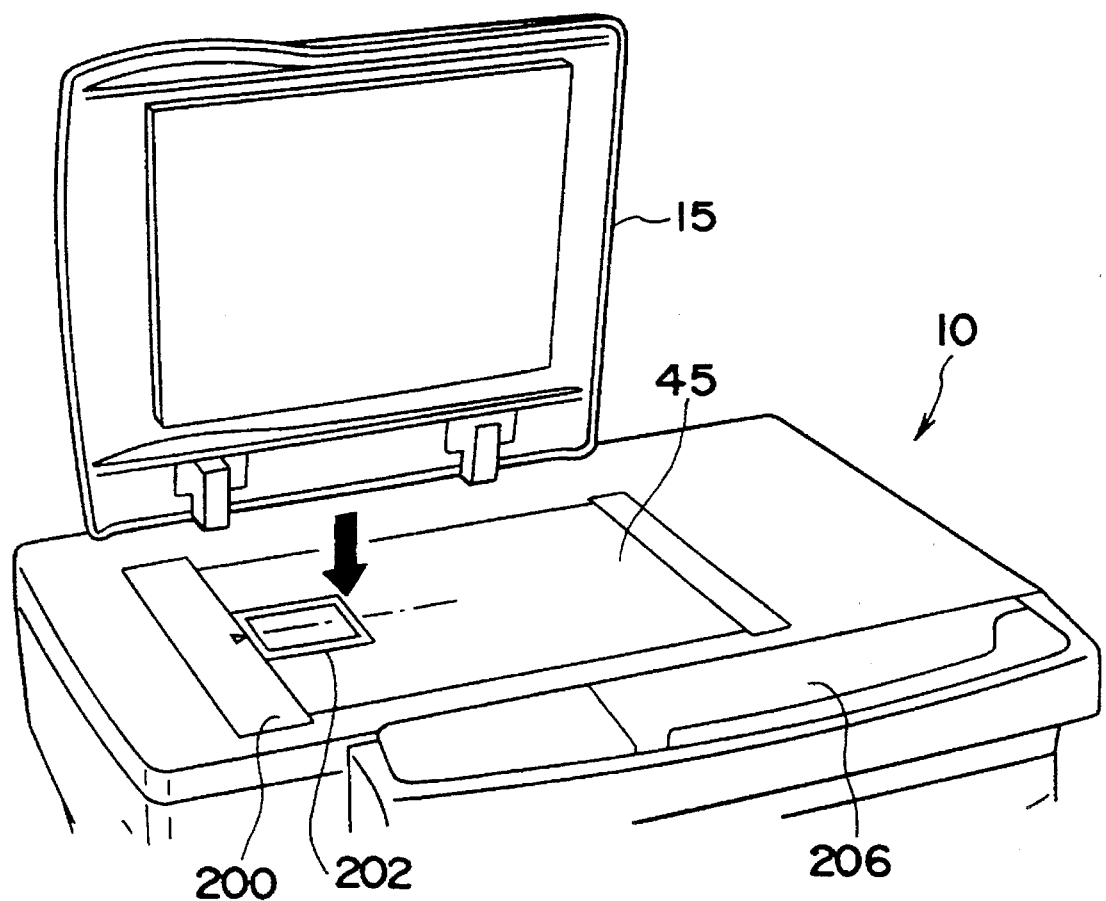
FIG. 4 is a perspective view illustrating a state in which a photograph original abuts the original guide and is actually set.

As illustrated in FIG. 4, the original guide 200 which is narrow and elongated is disposed at a position along the short end side of the transparent glass plate 45 at the copier 10. A photograph original 202 which will be described later is set so as to abut the transparent glass plate 45 side of the original guide 200. When the photograph original 202 is set, a triangular mark, which is directed transversely and which is marked at a longitudinal direction intermediate portion of the original guide 200, is positioned at the center of the photograph original 202.

Figure 3:
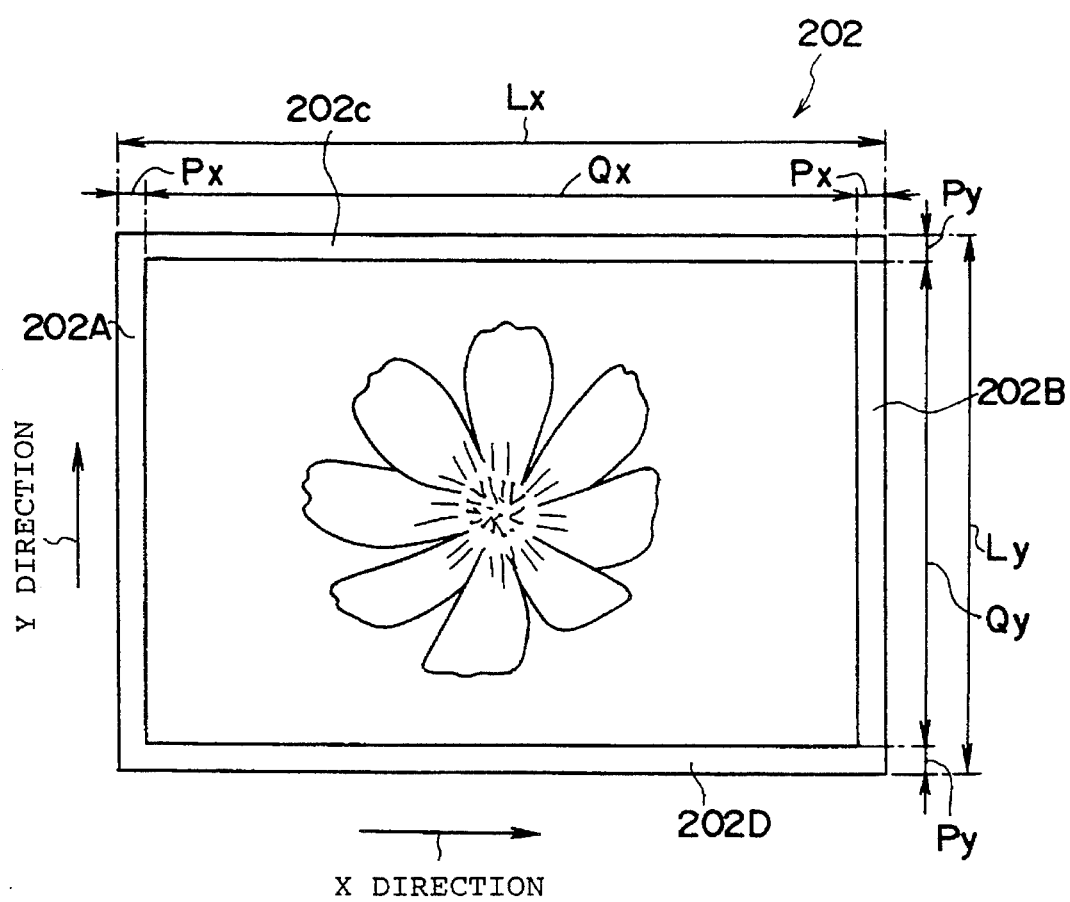
FIG. 3 is a plan view illustrating an enlarged version of the photograph original illustrated in FIG. 1A.

FIG. 3 is a plan view of the photograph original 202. As illustrated in this drawing, the photograph original 202 is a photograph original of a type in which white borders 202A, 202B, 202C, 202D are provided at the four peripheral portions.

The following two sets of dimensions are examples of the size of the photograph original 202. For an L-size (i.e., large-size) photograph original, the original dimensions are "89×127" (the original dimension $L_Y$ of the short side=89 mm; the original dimension $L_X$ of the long side=127 mm), and the image dimensions are "81×118" (the image dimension $Q_Y$ of the short side=81 mm; the image dimension $Q_X$ of the long side=118 mm). Further, for a 2L-size (i.e., extra-large-size) photograph original, the original dimensions are "127×178" (the original dimension $L_Y$ of the short side=127 mm; the original dimension $L_X$ of the long side= 178 mm), and the image dimensions are "119× 170" (the image dimension $Q_Y$ of the short side=119 mm; the image dimension $Q_X$ of the long side=170 mm). In order to facilitate explanation, an L-size photograph original is used in the following description.

The method of copying a photograph relating to the present embodiment is a copying method for forming, from the photograph original 202 (see FIG. 1A) having white borders 202A through 202D at the four peripheral portions thereof, a photographic print 204 (see FIG. 1C) in which these borders 202A through 202D are ultimately eliminated. Magnification setting processing and reference position shifting processing form the core of this method.

Figure 1A:
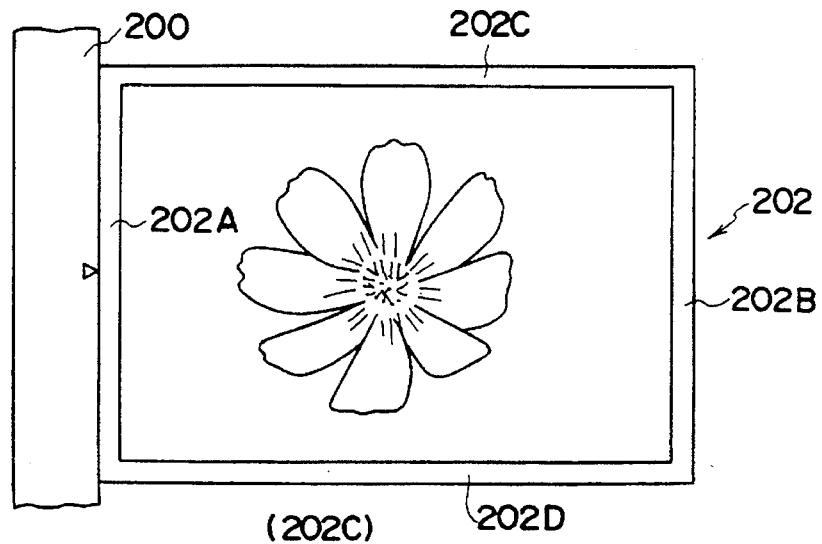
FIG. 1A illustrates a state in which a photograph original is set so as to abut an original guide in a method of copying a photograph by using a copier relating to the present invention.

First, the photographic print 202 is set as illustrated in FIG. 1A at the above-described main region, and thereafter, the presser cover 15 illustrated in FIG. 4 is closed. Next, at the operation panel 206 (see FIG. 4) which is disposed at the front side of the transparent glass plate 45, the number of photographic prints to be formed and the like are designated and a "borderless mode key" is pushed.

Figure 2:
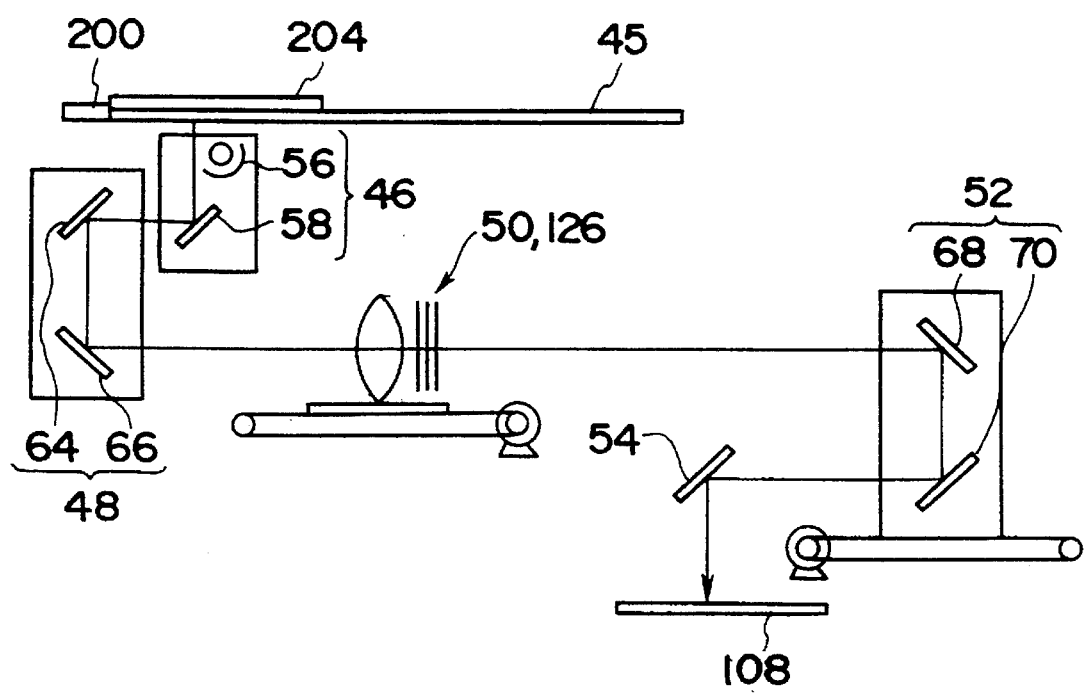
FIG. 2 is a schematic structural view conceptually illustrating exposure processing.

When the borderless mode key is pushed, magnification setting processing is carried out. Namely, as illustrated in FIG. 2, the filter unit 50/lens unit 126 as well as the mirror unit 52 which includes the fourth mirror 68 and the fifth mirror 70 are respectively slid by a predetermined amount. In this way, the magnification is automatically set to a predetermined enlargement magnification. Accordingly, for example, in a case of an L-size photograph original 202, the magnification is set to an enlargement magnification of 110%. The L-size photograph original 202 is magnified 110% for the following reason. The transverse dimensions of the white borders 202A, 202B at the short sides of the L-size photograph original 202 shown in FIG. 1A are $P_X$=4.5 mm. In order to eliminate these borders by increasing the magnification, an enlargement magnification of approximately 108% is required [100×(118+2×4.5)/118≈108%]. On the other hand, the transverse dimensions of the white borders 202C, 202D of the long sides are $P_Y$=4.0 mm. In order to eliminate these borders by increasing the magnification, an enlargement magnification of approximately 110% is required [100×(81+2×4.0)/81≈110%]. Therefore, it is necessary to set an enlargement magnification of 110% in order to eliminate both at the same time. Incidentally, for 2L-size photograph originals, an enlargement magnification of 107% is set for the same reason as above.

Figure 1B:
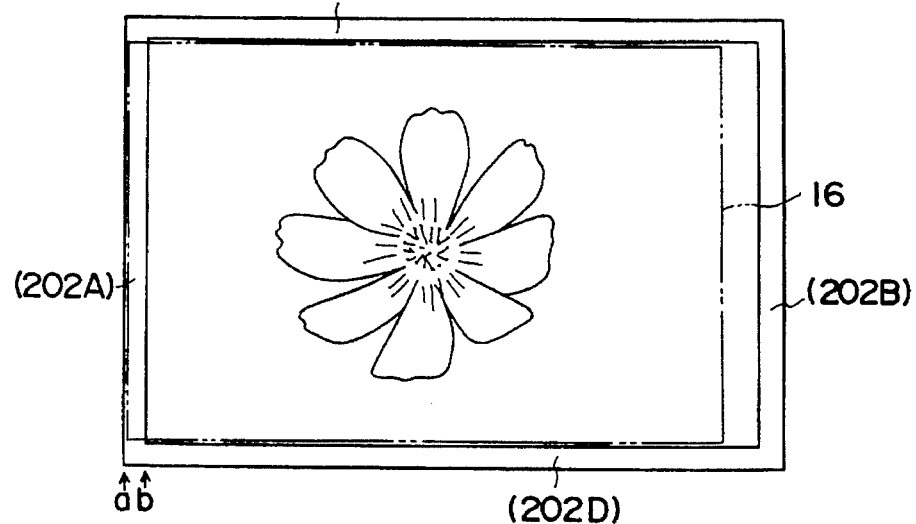
FIG. 1B illustrates a state when magnification setting processing and reference position shifting processing are effected in the method of copying a photograph by using a copier relating to the present invention.

Assuming that only the above magnification setting processing has been carried out, when exposure processing is carried out by the exposure device 38, the photosensitive material 16 is cut in advance so as to match the original dimensions of the photograph original 202 as will be described later, so that the range illustrated by the two-dot chain line in FIG. 1B is the exposure range of the image of the photograph original 202. Accordingly, a total of three regions, i.e., the white border 202B at the side opposite the original guide 200 and the white borders 202C, 202D at the long sides, are eliminated. Viewed in another way, by effecting only the above-described magnification setting processing, the white border 202A adjacent to the original guide 200 is not eliminated and remains. This is because, as described in the "Description of the Related Art" and previously in this "Description of the Preferred Embodiment" section, enlargement is effected with the position of the transversely-directed triangular mark of the document guide 200 as the center of enlargement.

Therefore, in the present invention, in addition to the above-described magnification setting processing, reference position shifting processing, which will be described hereinafter, is carried out.

Figure 1C:
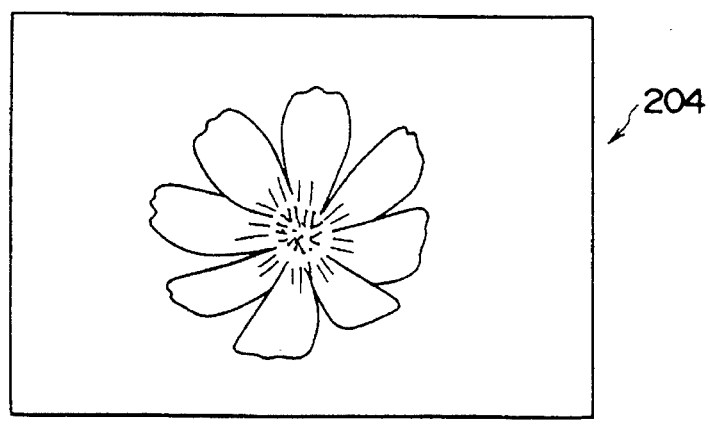
FIG. 1C illustrates a photographic print formed by the method of copying a photograph by using a copier relating to the preset invention.

Namely, when magnification setting processing is completed, a message such as "Press Start Key" or the like is displayed, and the start key is pushed. When the start key is pushed, the nip rollers 18 and the cutter 20 are operated as described above (the size of the photosensitive material 16 after cutting matches the original dimensions "89×127" of the photograph original 202), and the photosensitive material 16 is conveyed to the exposure section 22 with the photosensitive surface thereof facing upward. Here, in the present embodiment, the point in time at which conveying of the photosensitive material 16 to the exposure section 22 begins is a predetermined period of time later than the point in time at which ordinary conveying begins. Specifically, for example, the time when a drive signal is supplied to a motor to drive and rotate the conveying roller 23 is controlled so as to be delayed by a predetermined period of time. This predetermined period of time is obtained by dividing, by the conveying speed of the photosensitive material 16, a value which is the product of the transverse dimension $P_X$ of the white border 202A of the short side and the set magnification. Further, it suffices to not control the driving of the conveying roller 23, and to control the timing of the operation of the other conveying rollers 19, 21 or the nip rollers 18. In this way, the reference position, which is the starting point when exposure processing is carried out, is shifted from position a to position b (see FIG. 1B). In other words, the exposure range illustrated by the two-dot chain line (the range at which the portion of the photosensitive material 16 to be exposed exists) is shifted by an amount equal to the product of the set magnification and the transverse dimension $P_X$ of the white border 202A which would otherwise remain. As a result, after the previously-described remaining operations at the copier 10 have been carried out, a photographic print 204 in which all of the white borders 202A through 202D at the four peripheral portions have been eliminated is formed as illustrated in FIG. 1C.

The present embodiment provides a method of copying a photograph in which the white borders 202B through 202D other than the white border 202A at the abutting side are eliminated by magnification setting processing which automatically sets the magnification to a predetermined enlargement magnification, and in which the remaining abutting side white border 202A is eliminated by reference point shifting processing in which the reference point, which is a reference at the time of carrying out exposure processing or transfer processing, is shifted by a predetermined amount. Therefore, from the photograph original 202 which has the white borders 202A through 202D at the four peripheral portions thereof, the photographic print 204 in which these borders are eliminated can be obtained.

In the present embodiment, as reference position shifting processing, a method is used in which the point in time at which conveying of the photosensitive material 16 to the exposure point begins is delayed by a period of time corresponding to the white border 202A. However, if a structure is used in which exposure is carried out toward the original guide 200 side from the white border 202B at the side opposite the original guide 200, conversely, the point in time at which conveying of the photosensitive material 15 to the exposure point begins may be set ahead by a period of time corresponding to the white border 202A.

However, the present invention is not limited to the above, and the methods described hereinafter may also be used as the method of reference position shifting processing.

For example, by changing the position at which light illumination by the lamp unit 45 starts from position a to position b in FIG. 1B, the reference position which is the starting point when exposure processing is effected, is shifted. In this method, the point in time at which conveying of the photosensitive material 16 to the exposure point begins matches the conventional point in time of the start of exposure. In accordance with this method, because exposure processing is carried out with the white border 202A removed in advance, the white border 202A is not exposed onto the photosensitive material 16 and is thereby eliminated.

Further, for example, the original guide 200 itself may be structured so as to be slidable over a distance equal to the transverse dimension $P_X$ of the white border 202A in a direction of moving away from the transparent glass plate 45. When the borderless mode key is pressed, for example, a motor is started, and the original guide 200 is slid automatically over the transverse dimension $P_X$ via gears and racks. As described above, after the pre-processing for exposure processing has been effected, if the photograph original 202 is set so as to abut the original guide 200 which has been slid, it will be the same as if the white border 202A at the abutting side never existed. Accordingly, the white border 202A is eliminated in the same way as described above.

The above-described methods focus on exposure processing. However, in cases in which transfer processing is targeted, the following method can be used. For example, at the time of transfer processing at the heat developing transfer section 104, i.e., at the time at which the photosensitive material 16 and the image receiving material 108 are laminated by the laminating roller 120, the point in time at which the conveying of the image receiving material 108 by the laminating roller 120 begins can be delayed or set ahead by a period of time corresponding to the transverse dimension $P_X$ of the white border 202A. The reference position which is the starting point when transfer processing is effected is thereby shifted. In this case, at the point in time at which exposure processing is effected, the white border 202A at the original guide 200 side still remains exposed on the photosensitive material 16, but this portion is not transferred to the image receiving material 108. Accordingly, the white border 202A is eliminated. Note that the period of time corresponding to the transverse dimension $P_X$ is a period of time obtained by dividing, by the conveying speed of the image transfer material 108, the product of the transverse dimension $P_X$ of the white border 202A and the set enlargement magnification.

What is claimed is:

1. A method of copying a photograph by using a copier, by using a copier in which copying processing is carried out with an original abutting a member provided at a position corresponding to one side of a platen glass, said method forming, from a photograph original having white borders at the four peripheral portions thereof, a photographic print in which the borders are eliminated, said method comprising the steps of:

effecting magnification setting processing, in which, given that P is a transverse dimension of each of the white borders and Q is an image dimension, magnification is set to a predetermined enlargement magnification of greater than or equal to $100\times(Q+2P)/Q$ and the photograph original is enlarged at the predetermined enlargement magnification, said magnification setting processing being effected by selection of a border eliminating mode; and effecting reference position shifting processing in which a reference position, which is a reference at a time at which one of exposure processing and transfer processing is carried out during copying processing, is shifted by an amount corresponding to the transverse dimension P of the white border at one side of the photograph original which one side abuts the member provided at the position corresponding to the one side of the platen glass.

2. A method of copying a photograph according to claim 1, wherein said reference position shifting processing is effected such that, during exposure processing, a point in time at which conveying of a photosensitive material to an exposure point at which the photosensitive material is exposed begins differs, by an amount of time corresponding to the transverse dimension P, from a point in time at which conveying of a photosensitive material begins during ordinary copying processing.

3. A method of copying a photograph according to claim 2, wherein the amount of time corresponding to the transverse dimension P is a value obtained by dividing, by a conveying speed of the photosensitive material, the product of the predetermined enlargement magnification and the transverse dimension P of the white border at the one side of the photograph original.

4. A method of copying a photograph according to claim 1, wherein said reference position shifting processing is effected such that, during exposure processing, a position at which illumination of light from a light source onto the photograph original begins is moved by a length of the transverse dimension P.

5. A method of copying a photograph according to claim 1, wherein said reference position shifting processing is effected such that, during a preliminary processing of the exposure processing, the member provided at the position corresponding to the one side of the platen glass is moved by a length of the transverse dimension P in a direction opposite to a side at which the photograph original is disposed.

6. A method of copying a photograph according to claim 5, wherein the preliminary processing of the exposure processing is effected by moving an abutment member, which the one side of the photograph original abuts, in a direction substantially orthogonal to the one side of the photograph original.

7. A method of copying a photograph according to claim 1, wherein said reference position shifting processing is effected such that, during transfer processing, a point in time at which transfer of an image from an exposed photosensitive material to an image receiving material begins differs, by an amount of time corresponding to the transverse dimension P, from a point in time at which transfer begins during ordinary transfer processing.

8. A method of copying a photograph according to claim 7, wherein the amount of time corresponding to the transverse dimension P is a value obtained by dividing, by a conveying speed of the image receiving material, the product of the predetermined enlargement magnification and the transverse dimension P of the white border at the one side of the photograph original.

9. A method of copying a photograph according to claim 1, wherein in said magnification setting processing, the photograph original is enlarged with a substantial center of the member provided at the position corresponding to the one side of the platen glass as a reference.

10. A method of copying a photograph by using a copier, by using a copier in which copying processing is carried out with an original abutting a member provided at a position corresponding to one side of a platen glass, said method forming, from a photograph original having white borders at the four peripheral portions thereof, a photographic print in which the borders are eliminated, said method comprising the steps of:

effecting magnification setting processing, in which, given that P is a transverse dimension of each of the white borders and Q is an image dimension, magnification is set to a predetermined enlargement magnification of greater than or equal to $100\times(Q+2P)/Q$ and the photograph original is enlarged at the predetermined enlargement magnification with a substantial center of the member provided at the position corresponding to the one side of the platen glass as a reference, said magnification setting processing being effected by selection of a border eliminating mode; and effecting reference position shifting processing in which a reference position, which is a reference at a time at which exposure processing is carried out during copying processing, is shifted by an amount corresponding to the transverse dimension P of the white border at one side of the photograph original which one side abuts the member provided at the position corresponding to the one side of the platen glass.

11. A method of copying a photograph according to claim 10, wherein said reference position shifting processing is effected such that, during exposure processing, a point in time at which conveying of a photosensitive material to an exposure point at which the photosensitive material is exposed begins differs, by an amount of time corresponding to the transverse dimension P, from a point in time at which conveying of a photosensitive material begins during ordinary copying processing.

12. A method of copying a photograph according to claim 11, wherein the amount of time corresponding to the transverse dimension P is a value obtained by dividing, by a conveying speed of the photosensitive material, the product of the predetermined enlargement magnification and the transverse dimension P of the white border at the one side of the photograph original.

13. A method of copying a photograph according to claim 11, wherein said reference position shifting processing is effected such that a point in time at which supply of a signal to a drive source of a conveying member which conveys the photosensitive material begins differs, by an amount of time corresponding to the transverse dimension P, from a point in time at which supply of a signal to a drive source of a conveying member begins during ordinary copying processing.

14. A method of copying a photograph according to claim 10, wherein said reference position shifting processing is effected such that, during exposure processing, a position at which illumination of light from a light source onto the photograph original begins is moved by a length of the transverse dimension P.

15. A method of copying a photograph according to claim 10, wherein said reference position shifting processing is effected such that, during a preliminary processing of the exposure processing, the member provided at the position corresponding to the one side of the platen glass is moved by a length of the transverse dimension P in a direction opposite to a side at which the photograph original is disposed.

16. A method of copying a photograph according to claim 15, wherein the preliminary processing of the exposure processing is effected by moving an abutment member, which the one side of the photograph original abuts, in a direction substantially orthogonal to the one side of the photograph original.

17. A method of copying a photograph by using a copier, by using a copier in which copying processing is carried out with an original abutting a member provided at a position corresponding to one side of a platen glass, said method forming, from a photograph original having white borders at the four peripheral portions thereof, a photographic print in which the borders are eliminated, said method comprising the steps of:

effecting magnification setting processing, in which, given that P is a transverse dimension of each of the white borders and Q is an image dimension, magnification is set to a predetermined enlargement magnification of greater than or equal to $100\times(Q+2P)/Q$ and the photograph original is enlarged at the predetermined enlargement magnification with a substantial center of the member provided at the position corresponding to the one side of the platen glass as a reference, said magnification setting processing being effected by selection of a border eliminating mode; and effecting reference position shifting processing in which a reference position, which is a reference at a time at which transfer processing is carried out during copying processing, is shifted by an amount corresponding to the transverse dimension P of the white border at one side of the photograph original which one side abuts the member provided at the position corresponding to the one side of the platen glass.

18. A method of copying a photograph according to claim 17, wherein said reference position shifting processing is effected such that, during transfer processing, a point in time at which transfer of an image from an exposed photosensitive material to an image receiving material begins differs, by an amount of time corresponding to the transverse dimension P, from a point in time at which transfer begins during ordinary transfer processing.

19. A method of copying a photograph according to claim 18, wherein the amount of time corresponding to the transverse dimension P is a value obtained by dividing, by a conveying speed of the image receiving material, the product of the predetermined enlargement magnification and the transverse dimension P of the white border at the one side of the photograph original.

20. A method of copying a photograph according to claim 18, wherein said reference position shifting processing is effected such that a point in time at which supply of a signal to a drive source of a conveying member which conveys the image receiving material begins differs, by an amount of time corresponding to the transverse dimension P, from a point in time at which supply of a signal to a drive source of a conveying member begins during ordinary copying processing.

* * * * *